United States Patent [19]
Pilskar

[11] Patent Number: 5,800,590
[45] Date of Patent: Sep. 1, 1998

[54] PLUNGER ASSEMBLY

[75] Inventor: Ove Per Pilskar, Sundsvall, Sweden

[73] Assignee: Emhart Glass Machinery Investments Inc., Wilmington, Del.

[21] Appl. No.: 842,192

[22] Filed: Apr. 23, 1997

[51] Int. Cl.[6] .................... C03B 9/193; C03B 9/41
[52] U.S. Cl. .................... 65/158; 65/160; 65/362; 65/229; 65/318; 65/DIG. 13
[58] Field of Search ............ 65/158, 160, 229, 65/318, 362, DIG. 13; 137/487.5; 251/129.08; 364/473.01, 473.02

[56] References Cited

U.S. PATENT DOCUMENTS

| | | |
|---|---|---|
| 3,834,617 | 9/1974 | Dyntar . |
| 4,499,920 | 2/1985 | Steffan et al. . |
| 4,662,923 | 5/1987 | Vajda et al. . |
| 4,723,976 | 2/1988 | Shanaberger . |
| 4,786,306 | 11/1988 | Pinkerton . |
| 4,867,778 | 9/1989 | Pinkerton . |
| 5,024,417 | 6/1991 | Voxbrunner . |
| 5,236,485 | 8/1993 | Leweringhaus et al. . |

FOREIGN PATENT DOCUMENTS

| | | |
|---|---|---|
| 0 802 167 | 10/1997 | European Pat. Off. . |
| 2313173 | 11/1997 | United Kingdom . |
| WO 94/22776 | 10/1994 | WIPO . |

*Primary Examiner*—Steven P. Griffin
*Attorney, Agent, or Firm*—Spencer T. Smith

[57] ABSTRACT

Controlled movement of the pneumatically operated plunger in the narrow neck press and blow process of manufacture of glass containers is achieved by use of a pressure regulating valve in the air supply to the plunger which determines the pressure supplied according to the magnitude of a control signal which is determined by set point means operating in response to timing pulses from a timing control of the machine.

5 Claims, 2 Drawing Sheets

PLUNGER ASSEMBLY

This invention is concerned with plunger mechanisms for use in glass container manufacturing machinery.

BACKGROUND TO THE INVENTION

The most widely used machine in the manufacture of glass containers is the I.S or individual section machine, which comprises a series of identical machine sections arranged alongside each other and operating out of phase with each other to produce a continuous series of containers.

In the manufacture of a container in a section, a gob of glass is supplied to a blank mould in which the gob is formed into a parison, the parison is transferred to a blow mould and is then blown into the shape of the finished container. Customarily a section may be single, double, triple or even quadruple gob—that is to say it is arranged to deal with 1, 2, 3 or 4 gobs in a cycle, and correspondingly comprises 1, 2, 3 or 4 blank moulds and 1, 2, 3 or 4 blow moulds.

The formation of a gob of glass into a parison in the blank mould is normally carried out by one of three processes:

1 Press and blow—in which the parison is pressed into a desired shape in the blank mould by a plunger, and is then transferred to the blow mould. Traditionally this process is used for wide mouthed containers and jars.

2 Blow and blow—in which a plunger is used to form a small recess in a gob of glass in the blank mould, and the glass is then blown into the shape of the parison in the mould.

3 Narrow neck press and blow (NNPB)—in which a comparatively narrow plunger is used to press the parison into the desired shape in the blank mould. This process has become more widely used in recent years, especially for lightweight bottles—e.g. beer bottles.

Customarily the plunger mechanism in a section is operated by compressed air. In the case of NNPB process, the plunger is comparatively long and thin. To obtain the initial movement of the plunger it is necessary to be able to develop sufficient force, but it is undesirable to use a high pressure of air because of the likelihood of developing too high a pressure in the glass towards the end of the plunger stroke. Consequently it is conventional to use comparatively low pressure air in the NNPB process, e.g. 6–10 psi, but to provide for the force necessary for the initial movement by using an operating piston with a fairly large cross sectional area.

In carrying out the NNPB process, the precise movement of the plunger is critical. It is desirable that movement of the plunger in the NNPB process should be as fast as possible—which points to using a higher pressure on the piston. However, because the plunger has a small cross section compared with the piston, the pressure developed by the plunger on the molten glass is considerably greater than the air pressure and thus while a higher pressure gives a fast and smooth movement of the plunger, it can lead to too high a pressure being developed in the molten glass, resulting in very small opening movements of the parts constituting the blank mould and the formation of thin flashings of glass on the parison and thus on the eventual container, which, particularly in the finish area, are commercially unacceptable.

Consequently, to provide commercially acceptable containers, it is necessary to use a lower pressure to move the plunger. This however reduces the speed of the movement of the plunger, and also, because of the tendency of a piston to 'overrun' the air pressure in low pressure pneumatic systems, also leads to irregular movement of the plunger.

Various proposals have been made in the past to attempt to overcome these problems.

In U.S. Pat. No. 4,662,923 and U.S. Pat. No. 5,236,485 plunger mechanisms in which movement of the plunger is controlled by a servofeedback arrangement are shown, but such mechanisms are hydraulically operated. While hydraulics have many advantages for the operation of mechanisms in glass machines, the use of oil provides an appreciable fire risk, and is therefore unacceptable to many users. Further, conventionally many other mechanisms in a glass machine are pneumatically operated, and the use of a hydraulically operated plunger mechanism requires an additional power source.

In EP 0 691 940 is shown a pneumatically operated plunger mechanism for use in a glass container manufacturing machine comprising a piston and cylinder device, a plunger mounted on the piston of the piston and cylinder device, a pipe leading from the cylinder to a supply of compressed air and a control valve in the pipe between the cylinder and the compressed air supply which control valve is a proportional valve which determines the pressure supplied to the cylinder according to the magnitude of a control signal provided to the valve. In this mechanism, the control signal is provided by a micro controller which derives the size of the signal by an algorithm dependent on position and pressure feedback signals from the piston and cylinder device. The system is thus a closed loop system, and also fairly complex and expensive.

It is one of the objects of the present invention to provide a pneumatically operated plunger mechanism in which movement of the plunger is controlled using a comparatively inexpensive open loop system.

BRIEF STATEMENT OF THE INVENTION

The present invention provides a pneumatically operated plunger mechanism for use in a glass container manufacturing machine comprising a piston and cylinder device a plunger mounted on the piston of the piston and cylinder device a pipe leading from the cylinder to a supply of compressed air a pressure regulating control valve in the pipe between the cylinder and the compressed air supply which determines the pressure supplied to the cylinder according to the magnitude of a control signal provided to the valve set point means for determining the magnitude of a control voltage which determines the magnitude of the control signal provided to the valve, which set point means is arranged to commence and terminate the control voltage in response to timing pulses from a timing control of the machine wherein the control signal comprises two portions, an initial minor portion for a very short time at a high value and a succeeding major portion at about 70% of the high value.

The present invention also provides a pneumatically operated plunger mechanism for use in a glass container manufacturing machine comprising a piston and cylinder device a plunger mounted on the piston of the piston and cylinder device a pipe leading from the cylinder to a supply of compressed air a pressure regulating control valve in the pipe between the cylinder and the compressed air supply which determines the pressure supplied to the cylinder according to the magnitude of a control signal provided to the valve.

set point means for determining the magnitude of a control voltage which determines the magnitude of a control signal supplied to the valve, which set point means is arranged to commence and terminate the control voltage in response to timing pulses from a timing control of the machine display means for displaying
(a) the variation of air pressure supplied to the cylinder with time and
(b) a desired variation of air pressure supplied to the cylinder with time whereby the set point means may be adjusted to cause the actual pressure variation to correspond with the desired pressure variation.

DESCRIPTION OF THE PREFERRED EMBODIMENT

There now follows a description, to be read with reference to the accompanying drawings, of a plunger mechanism embodying the invention.

Figure 1:
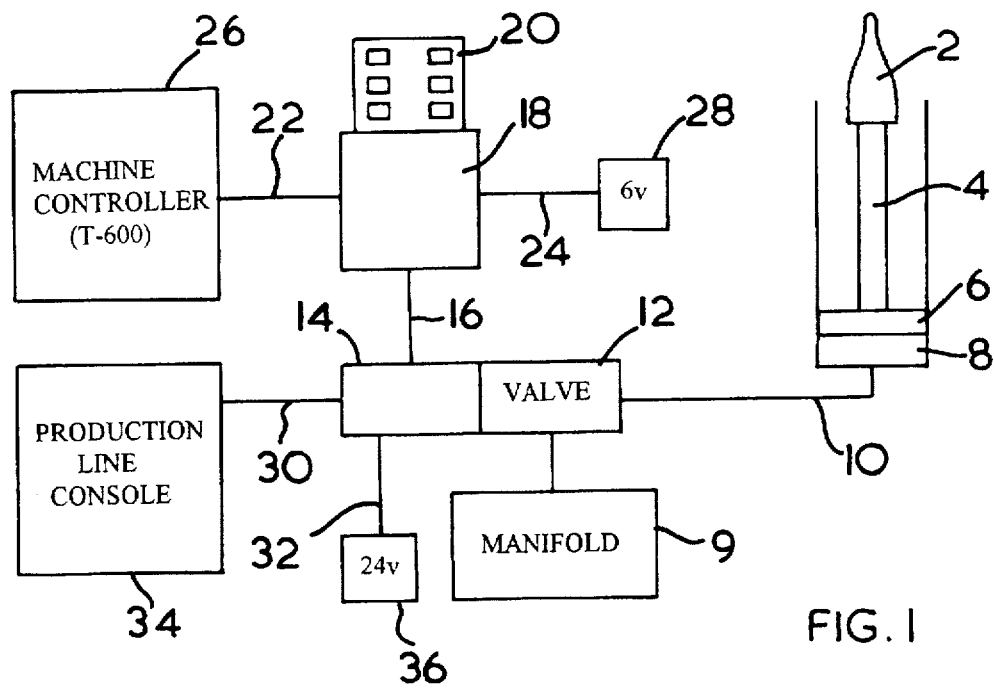
FIG. 1 shows, schematically, a plunger mechanism embodying the invention.

FIG. 1 shows schematically a pneumatically operated plunger mechanism for use in a section of an I.S machine. This mechanism comprises a piston and cylinder device comprising a piston 6 on a piston rod 4 movable in a cylinder 8. A plunger 2 is mounted, in a conventional manner, on the piston rod 4. A pipe 10 leads from the cylinder 8 to a manifold 9 which provides a source of compressed air at a pressure of 3 to 4 bar. A pressure regulating control valve 12 is located in the pipe 10 between the cylinder 8 and the manifold 9 and controls the supply of air to the cylinder 8 to move the piston 6 upwardly to cause the plunger 2 to perform a forming operation.

The control valve 12 is an electrically controlled proportional valve and comprises an electronic control 14 connected by a wire 16 to a set point means 18 which may conveniently be a potentiometer. Connected to the set point means 18 is a display panel 20: wire 22 leads from the set point means 18 to a machine controller 26 (for example that supplied by Emhart as T-600) which acts as a timing control and provides timing pulses to the set point means 18: wire 24 leads to a 6 volt supply 28. The controller 26 provides a timing pulse to the set point means 18 to cause it to initiate a control voltage to the valve 12, and another timing pulse to cause the control voltage to terminate.

The electronic control 14 of the valve 12 is connected by wires 30, 32 to display means, in the form of a Production Line Console 34, and to a 24 V supply 36.

The control valve 12 determines the pressure supplied to the cylinder 8 according to the magnitude of a control signal provided to the valve 12. The control valve 12 is modified from a standard commercially available proportional pressure regulating valve. Such commercially available valves are usually used in a through flow situation, and are used to control the pressure supplied through the valve between maximum and minimum values according to the size of a control voltage provided to the valve. In the present mechanism the valve 12 is arranged as an on-off valve, that is to say it provides a pressure which is proportional to a control signal provided in the electronic control 14 and in the absence of a signal is closed. The pulses from the controller 26 cause the set point means 18 to provide the control voltage which conventionally varies between 0 and 6.0 volts, and a proportionate pressure is provided by the valve. The electronic control 14 is so constructed that on receiving a control voltage from the set point means 18 it translates it into a control signal which comprises two portions, an initial minor portion for up to about 10 milliseconds at a high value, and a succeeding major portion at about 70% of the high value. Consequently, when the mechanism is operating, the machine controller 26 at appropriate times sends a timing pulse along the line 22 to cause the set point means 18 to commence a control voltage (of from 0 to 6 v) sent along the wire 16 to the electronic control 14. The control 14 translates the control voltage into a control signal with an initial, very short boost of a value higher than (about 140%) the control signal, and then a major portion of about the value of the control signal.

Figure 2:
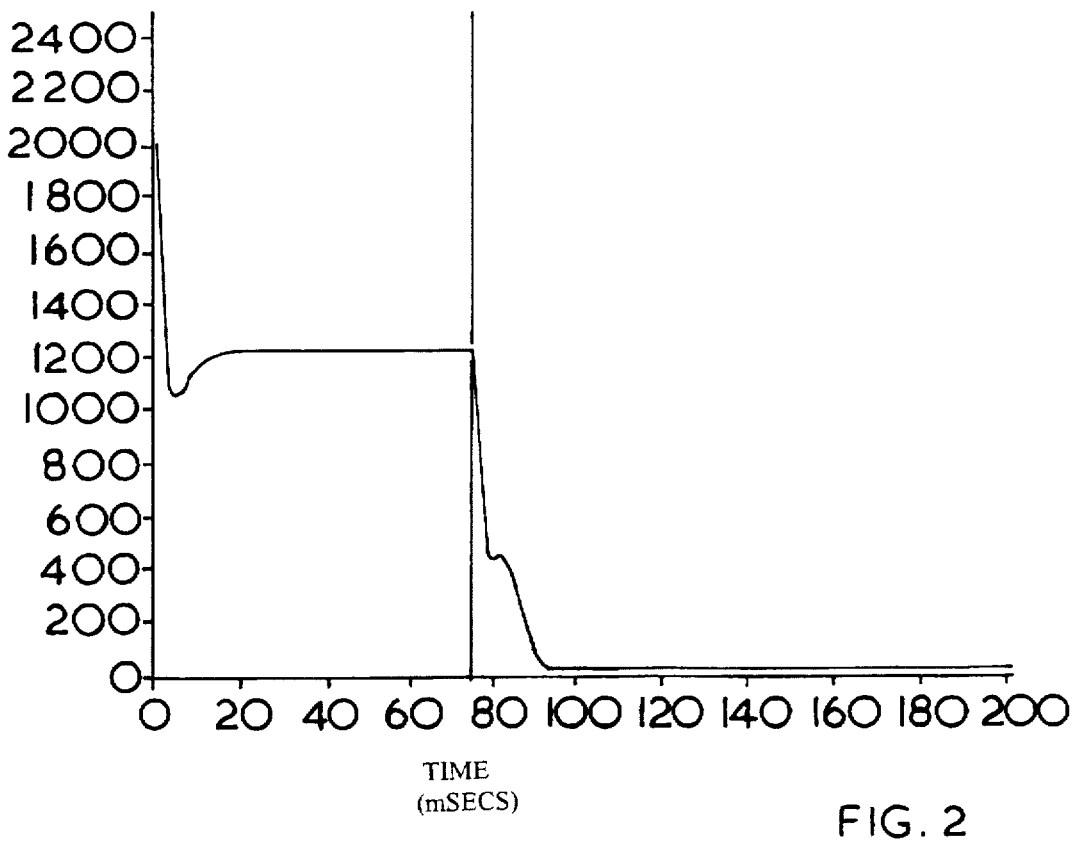
FIG. 2 shows a graph of air pressure against time in a plunger mechanism according to the invention.

FIG. 2 shows the resultant pressures supplied by the valve 12. As can be seen from FIG. 2, the initial boost, of about 2 bar, lasts for about 4 milliseconds, while the succeeding major portion of the pressure lasts for about 70 milliseconds. These times can of course be adjusted as desired. The initial boost serves to overcome the initial friction and inertia of the plunger and the piston and cylinder device, and the constant pressure effects smooth and consistent operation of the plunger mechanism.

While it is preferred that the uniform control voltage is transformed into the corresponding control signal in electronic control of the control valve 12, it will be realised that the control signal with its initial peak could if desired be created in the set point means 18.

Figure 3:
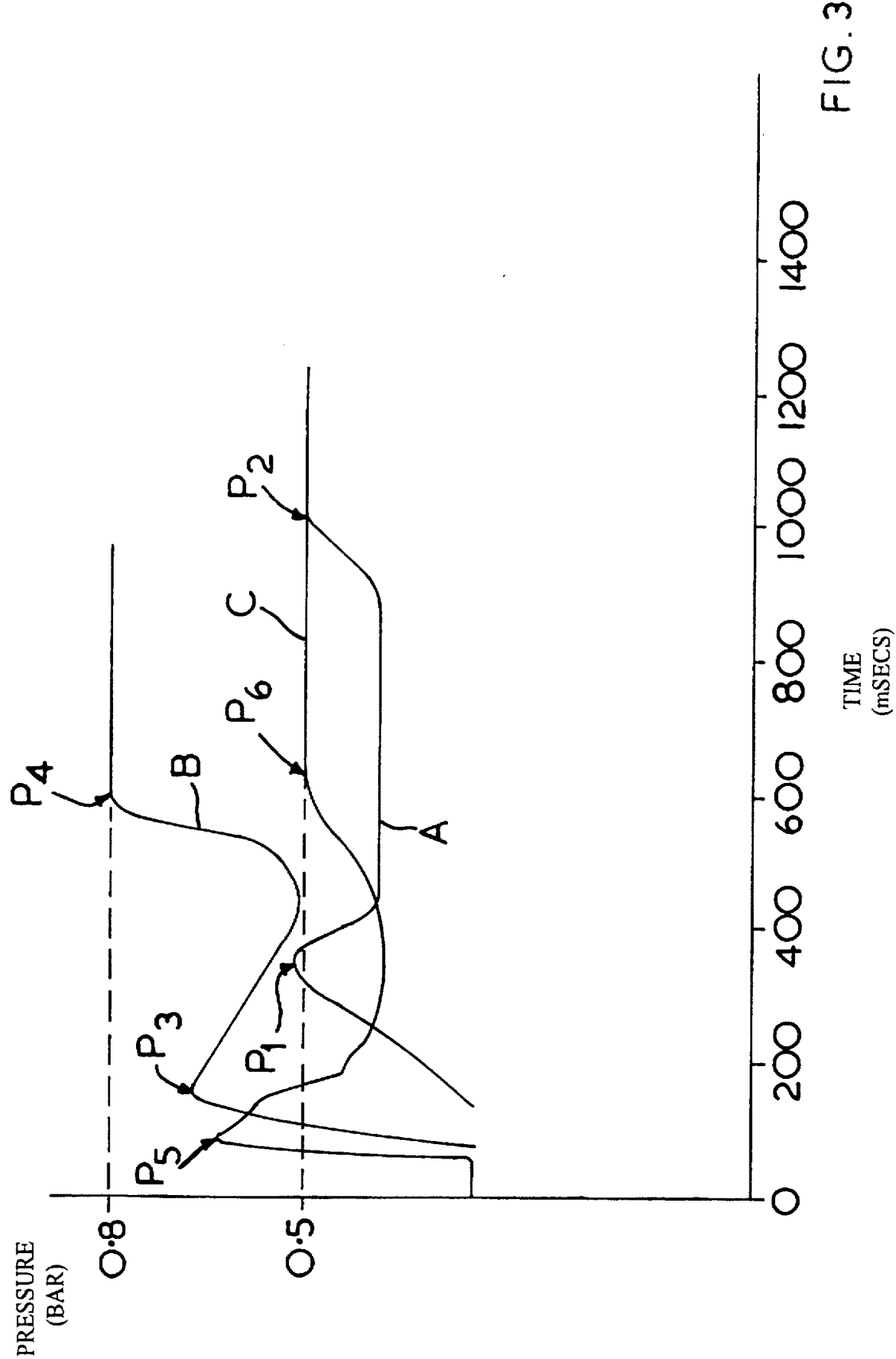
FIG. 3 shows diagrammatically, the air pressures exerted against a plunger in three different circumstances.

FIG. 3 illustrates typical performances of the present system and conventionally operated systems with the pressure developed in the cylinder plotted against time. Curve A shows the operation of a typical existing pneumatic system. The timing signal is provided at time 0 and it is about 100 milliseconds before any significant pressure is applied. The pressure rises to a peak at P1 of the full pressure applied (0.5 bar), but then, because of overrunning, falls back and only rises to the effective full pressure at the completion of the plunger stroke at P2 after about 1000 milliseconds. A common way to attempt to speed this up is to apply a higher pressure, as in curve B where a pressure of 0.8 bar is used rather than the correct 0.5 bar. This does give an earlier peak at P3, and completion of the stroke at the full pressure, P4, is achieved after 600 milliseconds—but the cost is the risk of the moulds opening slightly and a faulty parison being produced because of the high (0.8 bar) pressure used.

Curve C shows the operation of a mechanism embodying the invention. Not only is an initial peak, P5 achieved early, after 100 milliseconds, but the complete movement of the plunger is achieved after about 650 milliseconds (P6) with no damaging over pressure being obtained.

The set point means 18 is connected to the display panel 20 which shows the control voltage set for the plunger 2. In practice of course there are several (from 1 to 4) plungers in the section, each provided with its own control valve, and the control voltage for each of these plungers is displayed.

The production line console 34 is connected to the control 14 and is arranged to display for the plunger (or in a multi-gob situation, for a selected plunger) the variation of air pressure supplied by the control valve 12 with time, generally as shown in FIG. 2. Stored in the memory of the console 34 is a desired variation of air pressure supplied by the control valve 12 with time, and it is possible to display both the actual variation and the desired variation, and by adjustment of the set point means 18 to cause the actual pressure variation to correspond with the desired variation.

Experience will allow, for any particular plunger, a desired effective pressure variation curve to be set into the console 34, and when the plungers in a section are changed an immediate adjustment can be made to the potentiometer 18 to ensure that the desirable pressure conditions are provided to the plungers.

It will be seen that the pneumatically operated plunger mechanism just described obtains the desired movement of the plunger without requiring feedback, whether of pressure or position, from the piston and cylinder device to the control valve or the machine controller.

I claim:

1. A pneumatically operated plunger mechanism for use in a glass container manufacturing machine comprising:

a piston and cylinder device;

a plunger mounted on the piston of the piston and cylinder device;

a pipe leading from the cylinder of the piston and cylinder device to a supply of compressed air;

a pressure regulating control valve in the pipe between the cylinder and the compressed air supply which determines a pressure of compressed air which is supplied to the cylinder according to a magnitude of a control signal provided to the valve;

set point means for determining a magnitude of a control voltage which determines the magnitude of the control signal provided to the valve, which set point means is arranged to commence and terminate a control voltage in response to timing pulses from a timing control of the machine; and control signal means for providing a control signal to the valve wherein the control signal comprises two portions, an initial minor portion for a very short time at a high value and a succeeding major portion at about 70% of the high value.

2. A mechanism according to claim 1 wherein the control voltage is provided by the set point means to the control valve and is substantially constant and the control valve comprises an electronic control which converts the control voltage into the control signal.

3. A mechanism according to claim 2 wherein the control voltage is substantially equal to the voltage of the major portion of the control signal.

4. A mechanism according to claim 1 wherein the control signal is provided by the set point means to the control valve.

5. A pneumatically operated plunger mechanism for use in a glass container manufacturing machine comprising:

a piston and cylinder device;

a plunger mounted on the piston of the piston and cylinder device;

a pipe leading from the cylinder of the piston and cylinder device to a supply of compressed air;

a pressure regulating control valve in the pipe between the cylinder and the compressed air supply which determines a pressure of compressed air which is supplied to the cylinder according to a magnitude of a control signal provided to the valve;

set point means for determining a magnitude of a control voltage which determines the magnitude of a control signal supplied to the valve, which set point means is arranged to commence and terminate a control voltage in response to timing pulses from a timing control of the machine;

control signal means for providing a control signal to the valve wherein the control signal comprises two portions, an initial minor portion for a very short time at a high value and a succeeding major portion at about 70% of the high value; and display means for displaying
   (a) actual variation of air pressure supplied to the cylinder with time, and
   (b) desired variation of air pressure supplied to the cylinder with time;

whereby the set point means may be adjusted so that the actual variation of air pressure corresponds with the desired variation of air pressure.

* * * * *